(12) United States Patent
Matsunaga et al.

(10) Patent No.: US 10,715,852 B2
(45) Date of Patent: Jul. 14, 2020

(54) INFORMATION PROCESSING APPARATUS, INFORMATION PROCESSING METHOD, INFORMATION PROCESSING SYSTEM, AND PROGRAM

(71) Applicant: DENTSU INC., Tokyo (JP)

(72) Inventors: Hisashi Matsunaga, Tokyo (JP); Shun Maekawa, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 16/094,362

(22) PCT Filed: Apr. 20, 2017

(86) PCT No.: PCT/JP2017/015946
§ 371 (c)(1),
(2) Date: Oct. 17, 2018

(87) PCT Pub. No.: WO2017/183703
PCT Pub. Date: Oct. 26, 2017

(65) Prior Publication Data
US 2019/0132625 A1 May 2, 2019

(30) Foreign Application Priority Data

Apr. 20, 2016 (JP) ................................ 2016-084602

(51) Int. Cl.
*H04N 21/258* (2011.01)
*G09F 19/00* (2006.01)
(Continued)

(52) U.S. Cl.
CPC ....... *H04N 21/25866* (2013.01); *G06F 13/00* (2013.01); *G06Q 30/02* (2013.01);
(Continued)

(58) Field of Classification Search
CPC .......... H04N 21/258; H04N 21/25866; H04N 21/44213; G06Q 30/02; G06Q 30/0255;
(Continued)

(56) References Cited

U.S. PATENT DOCUMENTS 8,805,946 B1 * 8/2014 Glommen ............... H04L 67/10
709/206
8,938,787 B2 * 1/2015 Turgeman ............. H04W 12/06
726/7
(Continued)

FOREIGN PATENT DOCUMENTS

| EP | 2 728 895 | 5/2014 |
| JP | 2012-133780 | 7/2012 |

(Continued)

OTHER PUBLICATIONS

International Search Report, dated Jul. 4, 2017, by the Japan Patent Office (JPO) in International Application No. PCT/JP2017/015946.
(Continued)

*Primary Examiner* — Nasser M Goodarzi
*Assistant Examiner* — Patrick A Ryan
(74) *Attorney, Agent, or Firm* — Greenblum & Bernstein, P.L.C.

(57) ABSTRACT

To implement advertisement distribution suitable for a user by associating each device even when a user uses a plurality of devices, the information processing apparatus includes: an acquiring unit configured to acquire first identification information at least including an Internet Protocol (IP) address and information regarding a television viewing log, and second identification information at least including an IP address and an advertisement ID (Identifier); and a control unit configured to perform control to identify a combination of the viewing log and the advertisement ID corresponding
(Continued)

to the same IP address on the basis of the first identification information and the second identification information.

14 Claims, 5 Drawing Sheets

(51) Int. Cl.
    *G06Q 30/02*           (2012.01)
    *G06F 13/00*           (2006.01)
    *H04N 21/442*         (2011.01)

(52) U.S. Cl.
    CPC ..... *G06Q 30/0242* (2013.01); *G06Q 30/0244* (2013.01); *G06Q 30/0255* (2013.01); *G06Q 30/0272* (2013.01); *G09F 19/00* (2013.01); *H04N 21/258* (2013.01); *H04N 21/44213* (2013.01)

(58) Field of Classification Search
    CPC .......... G06Q 30/0272; G06Q 30/0242; G06Q 30/0244; G09F 13/00; G09F 19/00
    See application file for complete search history.

(56) References Cited

U.S. PATENT DOCUMENTS

| | | | | |
|---|---|---|---|---|
| 9,015,062 | B2* | 4/2015 | Demsey | G06Q 30/0255 705/14.66 |
| 9,509,742 | B2* | 11/2016 | Gordon | H04L 65/601 |
| 2002/0083441 | A1* | 6/2002 | Flickinger | G06Q 30/02 725/32 |
| 2007/0084915 | A1* | 4/2007 | Yan | G06Q 30/02 235/381 |
| 2009/0172728 | A1 | 7/2009 | Shkedi et al. | |
| 2011/0191811 | A1* | 8/2011 | Rouse | H04N 21/25808 725/93 |
| 2012/0084828 | A1 | 4/2012 | Rowe et al. | |
| 2014/0355592 | A1* | 12/2014 | Camps | H04W 24/08 370/338 |
| 2015/0106198 | A1* | 4/2015 | Miller | G06Q 30/0255 705/14.52 |
| 2015/0229729 | A1* | 8/2015 | van der Heijden | G06Q 30/02 705/14.45 |
| 2015/0358656 | A1 | 12/2015 | Matsumura et al. | |
| 2016/0125471 | A1* | 5/2016 | Hsu | G06Q 30/0269 705/14.66 |
| 2016/0148263 | A1 | 5/2016 | Yamamura | |
| 2016/0239868 | A1* | 8/2016 | Demsey | H04W 4/029 |
| 2017/0206552 | A1* | 7/2017 | Rajkumar | G06Q 30/02 |
| 2019/0297368 | A1* | 9/2019 | Whitehead | H04N 21/42684 |

FOREIGN PATENT DOCUMENTS

| | | |
|---|---|---|
| JP | 2013-543710 | 12/2013 |
| JP | 2014-093695 | 5/2014 |
| JP | 2016-015714 | 1/2016 |
| JP | 2016-038819 | 3/2016 |
| WO | 2015/064072 | 5/2015 |
| WO | WO 2015/143407 * | 9/2015 |

OTHER PUBLICATIONS

Extended European Search Report, dated Nov. 7, 2019, from the European Patent Office (EPO) in Application No. 17786040.0.

* cited by examiner

INFORMATION PROCESSING APPARATUS, INFORMATION PROCESSING METHOD, INFORMATION PROCESSING SYSTEM, AND PROGRAM

FIELD OF THE INVENTION

The present invention relates to an information processing apparatus, an information processing method, an information processing system, and a program for advertisement distribution.

BACKGROUND OF THE INVENTION

Targeted advertising (target advertisements) for individual users has been widely employed as an Internet advertisement tool. For example, in behavior targeting advertisements, advertisements are distributed only to customers who are interested in a specific genre on the basis of user's behavioral history (such as a Web search history), so that it is possible to obtain excellent advertising effects (such as recognition, understanding, purchase). In general, the advertisement may be information transmitted to the advertisement market through an advertising medium manageable by the advertiser, or may be, for example, arbitrary information that the advertiser pays money and transmits (advertises).

A technique has been proposed, in which, under an environment where a user receives services provided by different media from a plurality of devices, user's behaviors are inter-disciplinarily collected across each medium depending on user identification information (such as login information of a user) used in each device, and targeted advertisements are provided to such a device (see Patent Document 1).

CITATION LIST

Patent Documents

Patent Document 1: Japanese Unexamined Patent Application Publication No. 2012-133780

SUMMARY OF THE INVENTION

However, if information of a user is definitely associated on the basis of the user's login information, it is difficult to collect, for example, a behavior of a user in a device where the user does not log in.

In view of the aforementioned problems, it is therefore an object of the invention to provide an information processing apparatus, an information processing method, an information processing system, and a program, capable of implementing appropriate advertisement distribution to a user by associating each device even when the user uses a plurality of devices.

According to an aspect of the invention, there is provided an information processing apparatus including: an acquiring unit configured to acquire first identification information at least including an Internet Protocol (IP) address and information regarding a television viewing log, and second identification information at least including an IP address and an advertisement ID (Identifier); and a control unit configured to perform control to identify a combination of the viewing log and the advertisement ID corresponding to the same IP address on the basis of the first identification information and the second identification information.

According to the present invention, it is possible to implement advertisement distribution suitable for a user by associating each device even when the user uses a plurality of devices.

DESCRIPTION OF EMBODIMENTS

Paying attention to a fact that an advertising effect of the Internet advertisement tends to increase when the television advertisement is watched in advance, the inventors conceived the present invention by anticipating that the advertising effect of the Internet advertisement can be improved by distributing the Internet advertisement to viewers of the television advertisement.

Embodiments of the invention will now be described in details with reference to the accompanying drawings.

<Information Processing System>

Figure 1:
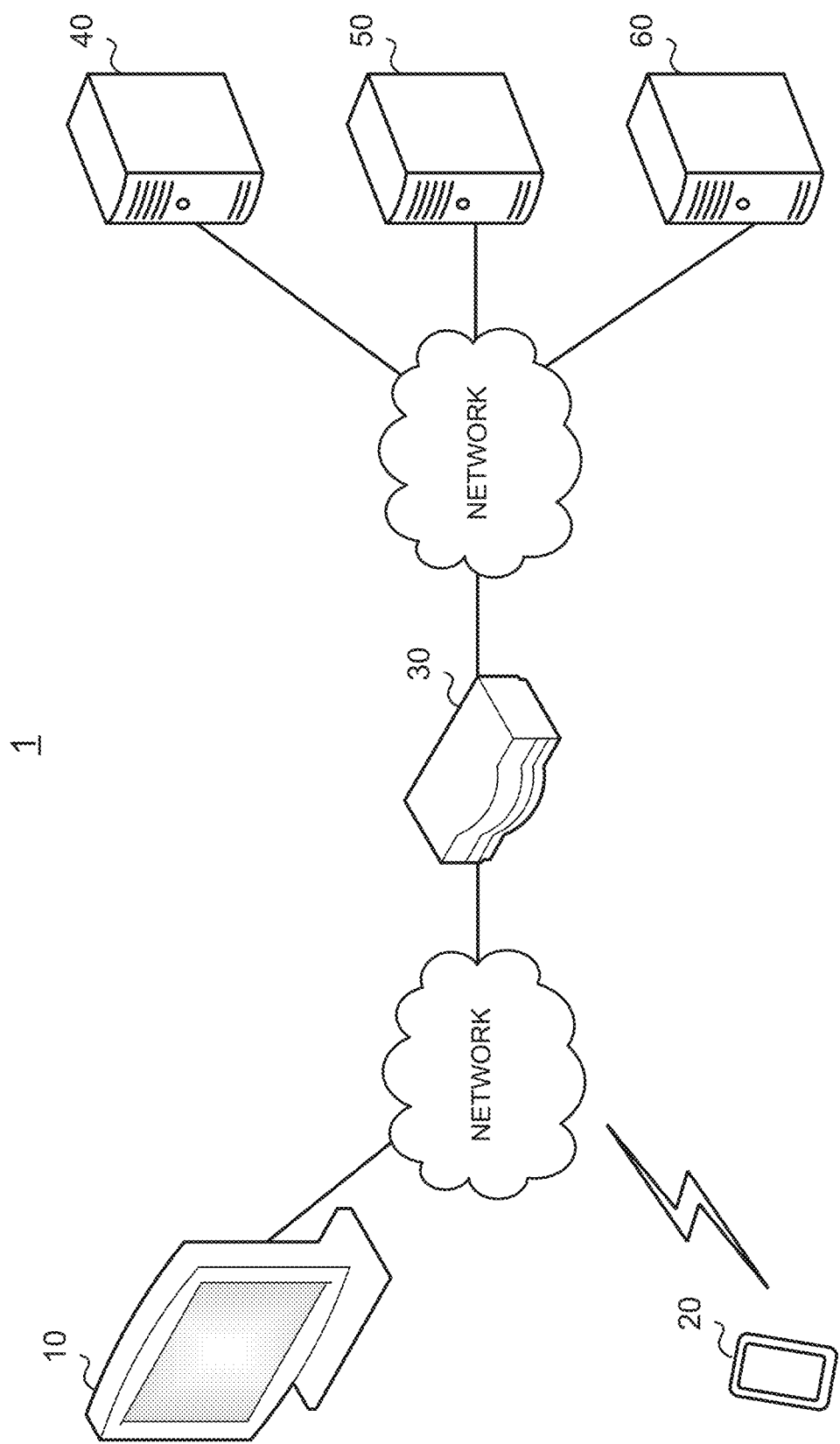
FIG. 1 is a diagram illustrating an exemplary schematic configuration of an information processing system according to an embodiment of the invention.

First, an information processing system according to the invention will be described. FIG. 1 is a diagram illustrating an exemplary schematic configuration of the information processing system according to an embodiment of the invention. The information processing system 1 of FIG. 1 includes a television 10, a device 20, a router 30, a matching server 40, a viewing log management server 50, and an advertisement distribution server 60.

According to an embodiment of the invention, in the configuration of the information processing system of FIG. 1, the matching server 40 identifies the television 10 and the device 20 used by the same user on the basis of information transmitted from the television 10 and information transmitted from the device 20. In addition, the advertisement distribution server 60 cooperates with the matching server 40 to transmit an Internet advertisement (hereinafter, simply referred to as an "advertisement") based on a TV viewing history of the television 10 to the user (device 20) having a successful matching result. As a result, it is possible to distribute an advertisement suitable for a user who watches a predetermined TV program and achieve an excellent advertising effect.

The television (television set) 10 is an apparatus having a function of receiving at least one of various broadcastings such as terrestrial broadcasting, and Broadcasting Satellite (BS), and Communication Satellite (CS). Note that the television 10 may have a function of receiving the Internet broadcasting (Internet TV). The television 10 may display (visualize) the received broadcasting.

The television 10 may collect viewing log on the television 10 (also called "television viewing log" or "broadcasting viewing log") depending on a user's consent and transmit the viewing log to the viewing log management server 50.

Here, the "viewing log" refers to information obtained by recording the content accessed by the television 10 in a time-series manner. For example, the viewing log may include information regarding a viewed program, information regarding a viewed Commercial Message (CM), and the like. In addition, the viewing log may include information by which at least one of a viewing behavior to the terrestrial broadcasting using the television 10, time-shifted reproduction, a browser start, execution of the net service, and the like can be identified. Furthermore, it is desirable that the viewing log includes a time stamp depending on the viewed program, the viewing behavior, and the like.

The device 20 is an apparatus that executes applications such as a browser in response to a user's manipulation. In addition, the device 20 receives the advertisement from the advertisement distribution server 60 as the application is operated.

Each of the television 10 and the device 20 may be a mobile terminal (mobile communication terminal) such as a mobile phone, a smart phone, and a tablet type terminal. Alternatively, the television 10 and the device 20 may be a fixed communication terminal such as a Personal Computer (PC), a television (TV), a multifunction television, a smart TV, an Internet Protocol (IP) TV, and a set-top box. That is, the television 10 in this specification may be substituted with any device other than the television set.

The router 30 is assigned an IP address from an Internet service provider and relays communication between the device inside the Local Area Network (LAN) and the apparatus of the Wide Area Network (WAN) side. The television 10 and the device 20 are connected to the router 30 in a wired and/or wireless (for example, Wi-Fi (registered trademark)) manner. The television 10 and the device 20 included in the same LAN communicates with an external network (such as the Internet) via the router 30.

In the configuration of FIG. 1, in communication of the television 10 and the device 20, the IP address seen from a communication counterpart is the IP address (the same IP address) of the router 30. This is implemented by the IP address masquerade function (Network Address and Port Translation: NAPT) function or the like of the router 30. Note that the IP address may be either IPv4 or IPv6, or an address obtained by extending or modifying these addresses.

The matching server 40 is an apparatus having a function of associating (matching) the television 10 and the device 20 used by the same user. Specifically, the matching server 40 identifies a combination of the television 10 and the device 20 on the basis of television identification information for identifying the television 10 (television viewing log identification information) and device identification information for identifying the device 20 (advertisement identifier (ID) identification information). A combination of the television 10 (the viewing log of the television 10) and the device 20 may be called user information because it is the information regarding a predetermined user.

Here, the advertisement ID is, for example, an identifier (advertisement identifier) for anonymous and unique advertisement distribution that can be opted out by a user. The advertisement ID may be a unique Cookie ID regarding a small file (Cookie) stored in the browser of the device 20. Note that the Cookie ID may be an ID different for each browser.

The advertisement ID may be an identifier acquired from an application installed in the device 20. For example, the advertisement ID may be based on Identification For Advertiser (IDFA), Advertising ID (ADID), or the like.

Note that the television identification information may also be referred to as "TVID", and the device identification information may also be referred to as "WebID".

The viewing log management server 50 is an apparatus having a function of managing (collecting, analyzing, and the like) the viewing log regarding the television 10. The viewing log management server 50 may be owned by a manufacturer of the television 10 or a broadcasting station (television station) that broadcasts on the television 10.

The advertisement distribution server 60 is an apparatus having a function of distributing the Internet advertisement to at least the device 20. The advertisement may include, for example, text, images (still images and moving pictures), sounds, other media, or a combination thereof. Note that the advertisement distribution server 60 may also transmit contents other than the advertisement to the device 20.

The advertisement distribution server 60 may include a Data Management Platform (DMP) or may determine the advertisement to be distributed using the DMP. In addition, the advertisement distribution server 60 may be a distribution server that uses a Demand Side Platform (DSP) or a distribution server that uses an advertisement distribution server (ad server) or an ad server other than the DSP.

The ad server may be a distribution server that uses an Application Programming Interface (API) provided by a specific company (Ads-API) such as "Twitter (registered trademark)" or "Facebook (registered trademark)". In addition, the ad server may be a video advertisement distribution server that distributes online video advertisements or a Content Management System (CMS) that distributes advertisements to television sets. Furthermore, the advertisement distribution server 60 may perform cooperation with the ad server such as DSP, API, video advertisement distribution, and CMS using the DMP (such as public DMP).

Functional configurations and hardware configurations of each apparatus such as the television 10 and the device 20 will be described below.

Note that this system configuration is just for exemplary purposes, and invention is not limited thereto. For example, although each apparatus includes one device in FIG. 1, the number of devices is not limited thereto, and a plurality of devices may also be possible. In addition, the information processing system 1 may not include a part of the apparatuses, or a predetermined apparatus function may be implemented by a plurality of apparatuses.

A plurality of apparatus functions may be implemented by a single apparatus. For example, the matching server 40, the viewing log management server 50, and the advertisement distribution server 60 may be embedded in a single server.

(Information Processing Method)

An information processing method according to an embodiment of the invention will now be described. Each information processing method may be applied to the information processing system described above.

First Embodiment: Matching Between TV and Device

According to a first embodiment, the television identification information (first identification information) at least includes an IP address of the television 10 and information regarding the viewing log of the television 10. In addition, the device identification information (second identification information) at least includes an IP address of the device 20 and information regarding an advertisement ID distributed to the device 20. Note that the device identification information may include a Web access log of the device 20.

Figure 2:
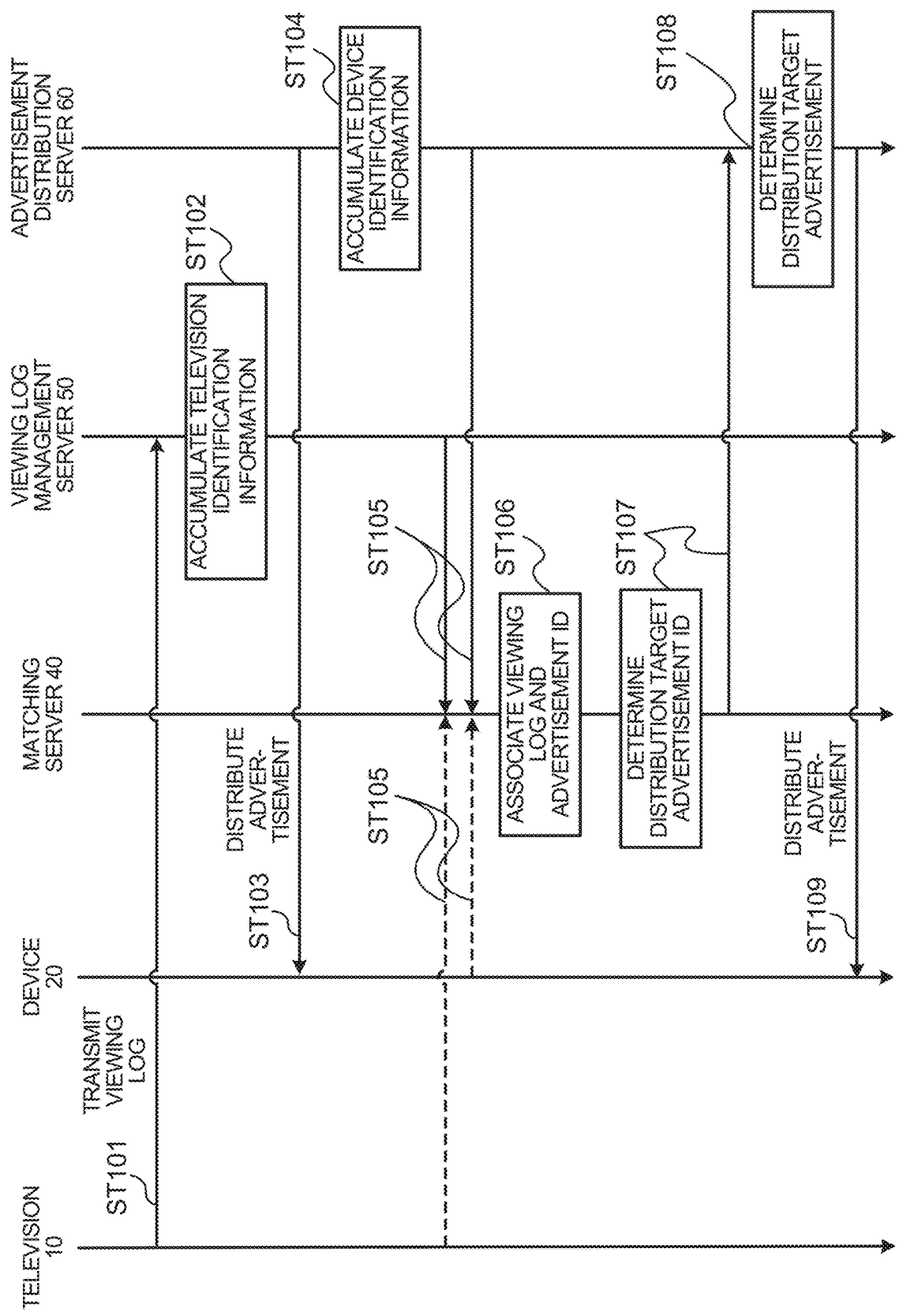
FIG. 2 is a diagram illustrating an exemplary sequence of an advertisement distribution processing according to a first embodiment of the invention.

FIG. 2 is a diagram illustrating an exemplary sequence of the advertisement distribution processing according to the first embodiment of the invention. The television 10 may transmit the viewing log to the viewing log management server 50 (step ST101). The transmission timing of the viewing log may be periodic (for example, every hour or everyday) or may be set to an arbitrary timing. The viewing log management server 50 may acquire the IP address of the television 10 (that is, the IP address of the router 30) and the information regarding the viewing log of the television 10 and accumulate a set thereof as the television identification information (step ST102).

The device 20 receives the advertisement distributed from the advertisement distribution server 60 during a use of Web browsing or a use of an application (step ST103). In this case, the advertisement distribution server 60 may acquire an IP address of the device 20 (that is, the IP address of the router 30) and accumulate a set of the IP address and the advertisement ID (for example, Cookie ID) as the device identification information (step ST104). In addition, when the advertisement ID is accumulated, a time stamp representing at least one of the advertisement distribution timing and the advertisement ID acquirement timing is desirably given to the advertisement ID.

The matching server 40 receives the television identification information from the television 10 and/or the viewing log management server 50 (step ST105). In addition, the matching server 40 receives the device identification information from the device 20 and/or the advertisement distribution server 60. The matching server 40 may acquire the Web access log of the device 20 from the device 20 and/or the advertisement distribution server 60 (step ST105).

The matching server 40 associates the viewing log of the television 10 and the advertisement ID of the device 20 on the basis of the IP address (step ST106). Specifically, the matching server 40 determines whether or not the IP address of the television 10 is identical to (matches) the IP address of the device 20. If they are identical, the matching server 40 stores a combination of this IP address, the corresponding viewing log, and the corresponding advertisement ID (also may be referred to as "user information").

The matching server 40 may determine a target of the matching processing on the basis of the time stamp given to the viewing log of the television 10 and the time stamp given to the advertisement ID. For example, in the matching server 40, when a time difference between acquirement timings of both the time stamps is equal to or shorter than a predetermined value, a control may be performed to perform the matching processing by determining that the viewing log and the advertisement ID are acquired at the same timing.

Note that each apparatus (such as the matching server 40, the television 10, and the viewing log management server 50) may form a set of the IP address of the television 10, the information regarding the viewing log of the television 10, and the time stamp given to the viewing log of the television 10 as a TVID, and build and store a table of the TVIDs from one or more TVIDs. The TVID may not include any one of pieces of the information.

Each apparatus (such as the matching server 40, the device 20, and the advertisement distribution server 60) may form a set of the IP address of the device 20, the information regarding the advertisement ID distributed to the device 20, and the time stamp regarding the advertisement ID as the WebID, and build and store a table of the WebIDs from one or more WebIDs. The WebID may not include any one of pieces of the information.

The timing for performing this association may be periodic (for example, every hour or everyday) or may be set to an arbitrary timing. The number of the televisions 10 and the number of devices 20 associated by the IP address may be one-to-one, one-to-multiple, multiple-to-one, or multiple-to-multiple. Note that the IP address may be associated with the Web access log.

For example, the matching server 40 determines the advertisement ID (such as the Cookie ID) of the advertisement distribution target on the basis of the viewing log of the television 10 of a predetermined user and transmits the advertisement ID to the advertisement distribution server 60 (step ST107). In this case, the matching server 40 may analyze the viewing logs of a plurality of users, collect (group) the advertisement IDs of a plurality of users having the same or similar viewing tendency, and transmit the grouped advertisement IDs to the advertisement distribution server 60.

For example, the matching server 40 may make a group of users who have the same or similar favorite program (for example, the same or similar name, genre, or performer of the program), a group of users who have the same favorite broadcasting station (channel), or a group of users who have many opportunities to watch a predetermined advertisement (such as an advertisement on vehicles).

Here, the advertisement ID transmitted to the advertisement distribution server 60 is not limited to those stored as the WebID. For example, assuming a case where the advertisement distribution server 60 employs the public DMP and stores the device identification information (for example, IP address+Cookie ID+Web access log) using the public DMP, the matching server 40 may acquire information regarding a matching relationship between the IP address and the advertisement ID (such as the Cookie ID) of the public DMP from the advertisement distribution server 60.

When the matching server 40 decides to distribute the advertisement to a user corresponding to a predetermined IP address on the basis of the table containing the TVIDs or the like stored in the matching server 40, the matching server 40 may identify the advertisement ID of the public DMP relating to the user on the basis of the aforementioned matching relationship and transmit the identified advertisement ID of the public DMP to the advertisement distribution server 60. As a result, even when an operator of the matching server 40 employs the public DMP, it is possible to associate the viewing log with segment data (also be referred to as "audience data") without disclosing the viewing log (viewing history), which is important information, to the DMP service provider.

The advertisement distribution server 60 determines the distribution target advertisement on the basis of the advertisement ID notified in step ST107 (step ST108). For example, the advertisement distribution server 60 may convert the notified advertisement ID to the advertisement ID (for example, Cookie ID) of the DSP. In this case, the advertisement ID of the DSP may be extended/modified on the basis of the Web access log of the public DMP as necessary. The advertisement distribution server 60 distributes the advertisement in which the user highly likely has interest when the advertisement is distributed to a device 20 of a predetermined user (step ST109).

In the case of cooperation with a predetermined ad server, similar to the case where the DSP is employed, the advertisement distribution server 60 may convert the notified advertisement ID into the advertisement ID used by this ad server. For example, the public DMP of the advertisement distribution server 60 may associate the notified advertisement ID with a predetermined segment ID. It is assumed that the ad server sets the advertisement distribution depending on the segment ID. Here, association between the segment ID of the ad server and the advertisement may be set on the basis of the analysis result for the viewing log (such as viewing tendency) stored in the matching server 40.

When the segment ID is set as the distribution target on the DMP, and the user's device 20 relating to the aforementioned advertisement ID accesses a Web page including the advertisement, the segment ID is transmitted from the DMP to this device 20 and is stored in the device 20. In addition, when the device 20 stores the segment ID, the ad server can transmit the advertisement to this device 20 as the DMP notifies information on this segment ID to the ad server.

The advertisement distribution server 60 may more closely cooperate with the matching server 40. For example, the matching server 40 may control (for example, create, expand, refine, or the like) the segment data of the DMP on the basis of, for example, the viewing log of the television 10 of a predetermined user.

Note that the segment data of the DMP may be controlled to include information regarding favorite programs of the user (such as a name, genre, or performer of the program) and data relating to user's interest such as a favorite broadcasting station (channel). In addition, the segment data of the DMP may be controlled so as to include a user who is responsive to the advertisement (such as clicking or registering of the advertisement) on the basis of the past advertisement placement information of the matching server 40 and/or the public DMP.

The matching server 40 may include the DMP or may be configured to implement the function of the public DMP. In this case, the public DMP of the aforementioned description may be read as the matching server 40.

According to the first embodiment described above, it is possible to perform the advertisement distribution considering the television viewing log by determining (identifying) a combination of the viewing log and the advertisement ID corresponding to the same IP address as the information regarding the same user.

Modification of First Embodiment

If the IP address is not changed, it is possible to accumulate the viewing log for the user for a long time and appropriately perform distribution of the advertisement suitable for the user.

However, due to security reasons or the like, the IP address may be allocated again when a predetermined period of time elapses from the allocation. For this reason, if the IP address is changed before accumulating the viewing log for the user, only a small amount of the viewing log for the user is obtained, and it may be difficult to distribute the advertisement appropriately by reflecting user's preference.

In this regard, the television 10 may transmit information regarding the identifier related to the television in addition to the viewing log to the viewing log management server 50. For example, the identifier may be referred to as an equipment ID. The identifier may include a serial number (manufacturing number), a product model number, a combination thereof, and the like, or the identifier may be a dynamically generated value. In addition, the equipment ID may be a value computed on the basis of these values (for example, values obtained by hashing the serial number).

The information regarding the identifier of the television may include information regarding a device (such as a card) necessary for producing the broadcasting. The information may be information regarding a BS Conditional Access System (B-CAS: registered trademark) card, a B-CAS card number (B-CAS ID) of twenty digits, a value obtained on the basis of the B-CAS ID (such as a value obtained by hashing the B-CAS ID).

In this manner, since the information regarding the identifier of the television is fixed data that does not change depending on time, it is possible to implement consistent association for each user by using the information.

In the modification of the first embodiment, the television identification information at least includes the IP address of the television 10, the information regarding the viewing log of the television 10, and the information regarding the identifier of the television 10. The viewing log management server 50 may acquire the IP address of the television 10, the information regarding the viewing log of the television 10, and the information regarding the identifier of the television 10 and accumulate a set of such information as the television identification information. Note that, as described above, the TV identification information (TVID) may include a time stamp.

The matching server 40 receives the television identification information from television 10 and/or the viewing log management server 50. The matching server 40 determines whether or not the IP address of the television 10 and the IP address of the device 20 are identical to each other. If they are identical, a combination (user information) of the IP address, the corresponding viewing log, the corresponding advertisement ID, and the information regarding the identifier of the television 10 is stored.

Note that, in the matching server 40, if the information regarding the identifier of the television 10 has been stored already, it is possible to store the viewing log as appropriate user information even when the IP address included in the received television identification information is different from the information already stored. That is, even when the IP address of the router 30 is changed, it is possible to continuously accumulate the viewing log before and after the change of the IP address of the router 30 in association with the information regarding the identifier of the same television 10.

In other words, the matching server 40 may determine (match) whether or not the information regarding the identifier of the television is identical between a plurality of pieces of television identification information. If the information is identical, the matching server 40 may determine (identify) that a plurality of viewing logs included in such television identification information are information regarding the same user.

Note that, since there is a possibility that the IP address changes at regular time intervals as described above, the matching processing described in the modification of the first embodiment is desirably performed within a predetermined period of time after obtaining each piece of the identification information.

The inventors conceived that the determination on the same user in the matching server 40 is performed in the following sequence by focusing on a fact that one IP address is associated with a plurality of advertisement IDs in some cases. Here, it is assumed that association (matching) between the television 10 and the device 20 is performed on the basis of the TVID and the WebID acquired at the same timing as possible. In addition, the association is performed on the basis of both IDs acquired at a time interval within a predetermined fresh period (approximately one to two weeks) at the maximum.

Here, it is determined whether the information (for example, equipment ID) regarding an identifier of a certain television 10 and the advertisement ID (for example, Cookie ID) of a certain device 20 belong to the same household on the basis of at least one of a first criterion and a second criterion.

The first criterion is a probability focusing on continuity (this may be referred to as an "A-type matching probability"). The inventors found the first criterion by focusing on a fact that the same IP address is continuously allocated regardless of a provider during a continuous single Internet session even in the case of the dynamic IP address.

The first criterion is a probability increasing as the number of records consecutively linked when the TVID table including the time stamp and the WebID table including the time stamp are respectively sorted in descending order with a set of the time stamp and the IP address. The matching server 40 may determine that the information regarding the identifier of the television 10 and the advertisement ID of the device 20 belong to the same household when the first criterion is equal to or higher than a predetermined threshold value.

The second criterion is a probability focusing on the variability (this may be referred to as a "B-type matching probability"). The inventors found the second criterion by focusing on a fact that, assuming that there are advertisement campaigns in the sequence of A, B, C, and D in chronological order, there is a high possibility that both IDs belong to the same household if the same equipment ID and the same Cookie ID are associated with different IP addresses at any timing when they are associated with a fresh IP address at each timing.

The second criterion is a probability increasing as the number of records in which the same information regarding the identifier of the television 10 and the same advertisement ID are associated with different IP addresses increases as a result of matching performed at every predetermined period. If the second criterion is equal to or higher than a predetermined threshold value, the matching server 40 may determine that the information on the identifier of the television 10 and the advertisement ID of the device 20 belong to the same household. Note that the predetermined period may be periodic or not periodic.

Note that the determination on the same household may be performed on the basis of a third criterion calculated on the basis of both the first criterion and the second criterion. For example, the matching server 40 calculates the first criterion and the second criterion for each equipment ID to be accumulated. In addition, the matching server 40 may calculate a deviation value of the first criterion and a deviation of the second criterion for a predetermined equipment ID out of the accumulated equipment IDs, and set an average of these deviation values as the third criterion for a predetermined equipment ID.

If the third criterion is equal to or higher than the predetermined threshold value, the matching server 40 may determine that the corresponding information on the identifier of the television 10 and the corresponding advertisement ID of the device 20 belong to the same household.

Whether or not the information and the advertisement ID belong to the same household may be determined using another policy. For example, if the television 10 and the device 20 are associated with different IP addresses within a predetermined period of time (for example, two weeks), the matching server 40 may determine that they belong to the same household (the association property is determined as "positive") and store them.

Meanwhile, when an association property different from the stored previous determination (association property) is associated (for example, when an advertisement ID different from the previous one is associated with a predetermined equipment ID of the television 10), this association property may be determined as "positive", or the previous association property may be determined as "positive" (that is, the association property is maintained). Considering that the Cookie ID is not necessarily fixed, the former is desirable. However, even when the IP address and the Cookie ID are not associated within the latest predetermined period (for example, the previous one month), the previous association property may be determined as "positive" (that is, the latest association property is used). As a result, it is possible to increase the number of advertisement distribution targets considering the viewing log.

Note that the determination on the same household described above may be performed, for example, using an identifier employed in a predetermined service (such as a login ID). For example, when the TVID and the WebID include a login ID, a user of the same household may be identified on the basis of the TVID and the WebID including the same login ID.

Second Modification of First Embodiment

When the viewing log management server 50 is owned by a manufacturer of the television 10, it is assumed that the accumulated viewing log includes data of all television stations that the television 10 can receive. On the other hand, when the viewing log management server 50 is owned by a specific television station, it is conceived that the accumulated viewing log includes only data regarding the specific television station.

There is a demand for an advertiser and/or an advertisement distributor to collectively manage the viewing log of the television 10 regarding a specific user. For this reason, the viewing log accumulated in the individual viewing log management server 50 owned by each television station are desirably integrated so that the viewing log for the same user can be handled collectively. In this regard, when the matching server 40 can access the individual viewing log management server 50, the matching server 40 may group, for example, the viewing logs having the same information regarding the identifier of the television 10 described above (such as B-CAS ID) out of the viewing logs for a plurality of television stations.

Here, the viewing logs of the viewing log management server 50 are not necessarily stored with the same association with other viewing log management servers 50. For example, in a certain viewing log management server 50, the IP address of the television 10, the viewing log, and the equipment ID may be associated as television identification information (first television identification information). However, in the other viewing log management server 50, the IP address of the television 10, the viewing log, and the B-CAS ID may be associated as television identification information (second television identification information).

In this case, the matching server 40 may group the viewing log, the equipment ID, and the B-CAS ID on the basis of the IP address of the television 10 for television identification information regarding a plurality of television stations (first television identification information and second television identification information).

That is, even when the information regarding the identifiers of the televisions included in a plurality of pieces of the television identification information is different (for example, one is the equipment ID, and the other is the B-CAS ID), the matching server 40 may determine (identify) a plurality of viewing logs (and the equipment ID and the B-CAS ID) corresponding to the same IP address as information regarding the same user if the IP addresses included in a plurality of pieces of the television identification information are identical.

Note that, in the second modification of the first embodiment, the matching server 40 may not receive information regarding the IP address of the device 20 and/or the advertisement ID.

Second Embodiment

In a multi-family house such as an apartment house or a building owned by an organization (such as a company or an incorporated corporation), a plurality of people of a plurality of households or a plurality of people of the organization may communicate using one IP address. If the viewing logs having utterly different preference are associated with the same IP address, it is difficult to perform appropriate advertisement distribution disadvantageously.

Figure 3:
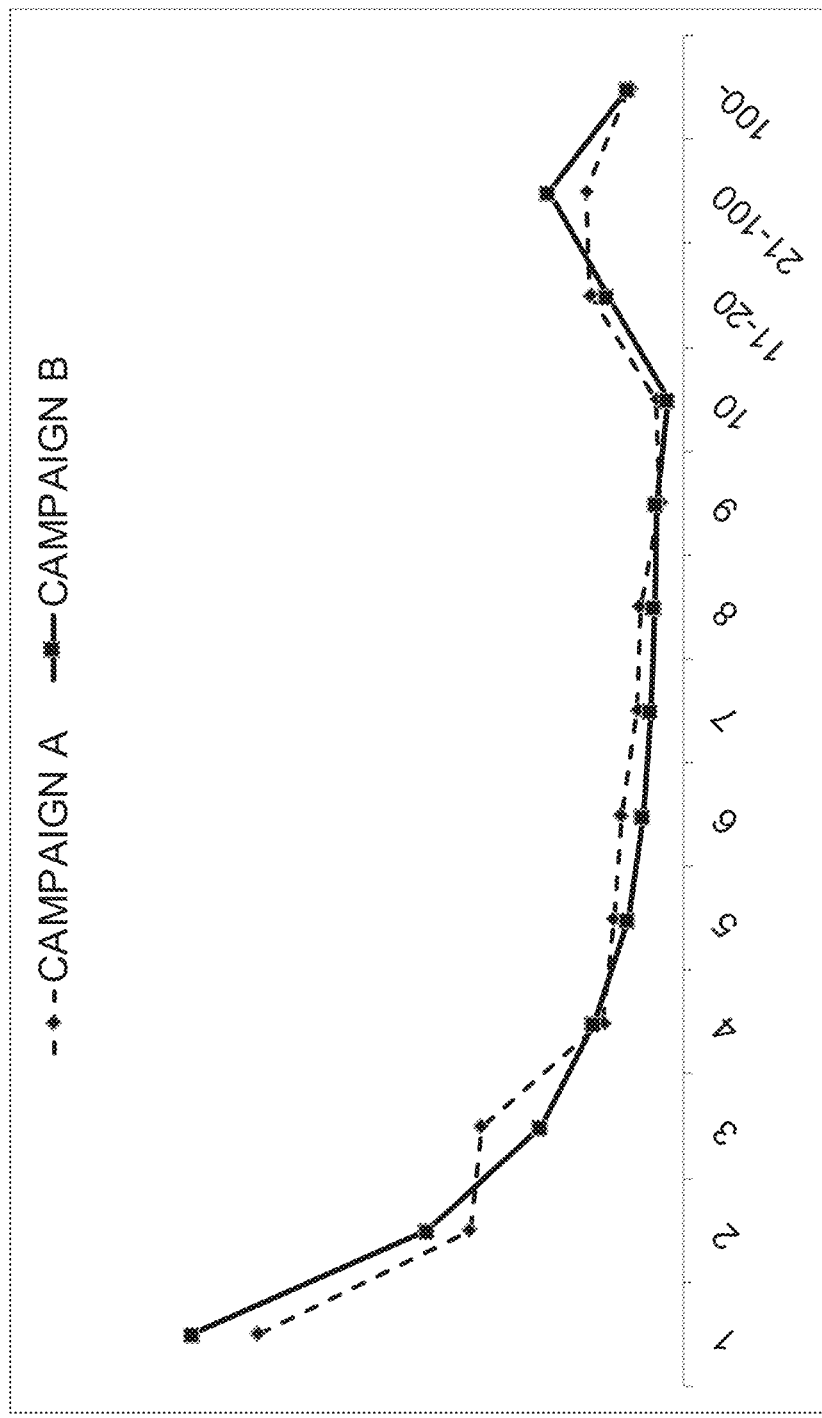
FIG. 3 is a diagram illustrating an exemplary association property of the number of advertisement IDs associated with one IP address.

In order to address this problem, the inventors studied the number of advertisement IDs associated with one IP address. As a result, the inventors found a characteristic of the number of advertisement IDs associated with one IP address. FIG. 3 is a diagram illustrating an exemplary association property of the number of advertisement IDs associated with one IP address.

In FIG. 3, for the advertisement campaigns A and B, the abscissa refers to the number of advertisement IDs (for example, Cookie IDs) associated with the IP address, and the ordinate refers to occurrence frequency of the IP address. In this example, in both campaigns, the occurrence frequency of the IP address decreases almost monotonously when the number of advertisement IDs per IP address ranges from about 1 to 10. However, when the number of advertisement IDs exceeds about ten, the occurrence frequency of the IP address starts to increase. The reason for this will be discussed below.

First, the inventors studied a case where only the detached house exists. In this case, a fact that the number of the associated advertisement IDs increases means that the number of people per household increases. Considering only the detached houses, the number of three or four people households is larger than the number of five people households, and the number of five people households is larger than the number of eight, nine, or ten people households. Therefore, it is predicted that the number of households decreases as the number of people per household increases. Considering this relationship, in the case of the detached house, similar to the number of households, the corresponding occurrence frequency of the IP address also decreases as the number of advertisement IDs associated with the IP address increases.

Here, the inventors predicted that, if there is the number of advertisement IDs (threshold value) in which the occurrence frequency of IP address increases inversely, the number of the associated households itself increases for the IP address of the number of advertisement IDs larger than the threshold value. That is, it was predicted that multi-family houses/organizations are included. In addition, for the number of televisions associated with the IP address, it is considered that there is a tendency similar to that of the number of advertisement IDs.

In this regard, the inventors conceived, as a second embodiment of the invention, a case where the data considered as users of the multi-family house are excluded. More specifically, when the number of advertisement IDs associated with one IP address becomes equal to or greater than a predetermined number (first threshold value), in the matching server 40, the IP address may be controlled not to perform advertisement distribution based on the viewing log. For example, the matching server 40 may not create/ expand the segment data of the DMP based on the viewing log for this IP address (reset/delete the segment data if already done). Alternatively, the IP address may be controlled so as not to transmit the advertisement ID of the public DMP relating to this IP address to the advertisement distribution server 60.

When the number of pieces of information regarding the identifier of the television associated with one IP address becomes equal to or larger than a predetermined number (second threshold), the matching server 40 may perform control not to perform advertisement distribution based on the viewing log for this IP address. Note that the first threshold value and the second threshold value may be different from each other or may be the same value.

The matching server 40 may include information (viewing log linked advertisement distribution flag) regarding availability of advertisement distribution based on the viewing log in the stored user information (an information set including the advertisement ID, the viewing log, and the like). Then, when the viewing log linked advertisement distribution flag included in the user information is "Negative", the matching server 40 may control not to transmit the information on the advertisement ID associated with the segment to the DMP/DSP.

According to the second embodiment described above, when at least one of the number of advertisement IDs corresponding to the same IP address and the number of pieces of information regarding the identifier of the television is equal to or greater than a predetermined number (threshold value), it may be determined that the IP address is highly likely allocated to an multi-family house and/or an organization (it is highly likely that a plurality of people having different characteristics/preference are communicating via the same router), and such an IP address may be excluded from the processing target.

Third Embodiment

In each embodiment described above, it is assumed that the users agree to acquire the viewing log. For this reason, there is a possibility that the viewing tendency differs from that of a general user (because the parameter is special). Therefore, the viewing log is desirably corrected to match the viewing tendency of general users.

According to the third embodiment, correction is performed by setting the viewing tendency of general users as a representative and setting the viewing log data separately collected as training data. The separately collected viewing log data may be referred to as a representative viewing log. It is desirable that the representative viewing log is mechanical viewing log data that keeps a relationship between the household and individuals of the household and is acquired after strictly managing the representation with the world. Note that, in the following example, in the case of simply a "viewing log" instead of the "representative viewing log", it is assumed that the viewing log is used to determine an advertisement to be distributed to a predetermined terminal (device 20) according to an embodiment of the invention.

For example, individual data regarding an individual audience rating may be used as the representative viewing log. This data may include household audience ratings in addition to the individual audience rating. In addition, this data may include householder information or not.

The correction target data is at least one of the viewing log having the householder information and the viewing log not having the householder information. A correction verification index may include at least one of an average daily viewing time (minute) of each household, the number of viewing days during an arbitrary week, a total viewing time (minute), a Gross Rating Point (GRP), or a combination thereof. For example, the verification index may include a daily average viewing time of each household and the number of viewing days during an arbitrary week.

The correction is performed, for example, through the following steps ST201 to ST203. Here, the description will be made by assuming that terrestrial broadcasting is employed. However, the same process may apply to other broadcasting types. In addition, this correction process may be performed either for the matching server 40 or the viewing log management server 50. Note that the correction may be performed for all of steps ST201 to ST203 or may be implemented by performing at least one process.

In step ST201, households having an unusually large number of the verification indexes in the terrestrial broadcasting are excluded. In step ST202, the distributions of the verification indexes of the training data as the representative viewing log and the target data are adjusted. Here, the target data may be employed in order of how much a share of the verification indexes between the terrestrial wave and other stations/each station of the terrestrial wave is similar to that of the representative viewing log at a predetermined time interval (for example, thirty minutes). Note that, in step ST202, correction of the viewing log having the householder information is performed for each householder (to adjust the distribution).

In step ST203, a principal component analysis is performed for variables of "station"×"week day"×"predetermined time interval (for example, 10 minutes)", and dimensional compression is performed. In addition, allocation is performed for each data of the representative viewing log (for example, each individual vote in the individual audience rating) on the basis of similarity of distance of each principal component, and this process is repeated until the distributions of the verification indexes are substantially matched.

According to the third embodiment described above, it is possible to adjust the viewing log of a user to a viewing tendency of a general audience.

Fourth Embodiment

The viewing log is typically a viewing log of each household (household viewing log). However, generally, individuals in the household have different devices 20. Therefore, in order to further refine advertisement distribution, the household viewing log is desirably separated into individual viewing logs.

As described above, the viewing log may include the householder information. According to the fourth embodiment, the number of people per a household, genders or ages of the constituents of the household, and the like are estimated from the viewing log data of a predetermined household using this householder data by setting the aforementioned representative viewing log as the training data. This estimation processing may be performed by the matching server 40 or the viewing log management server 50.

The target data used for estimation learning may include a viewing log having information such as the householder information, the number of people per household, and the household composition, and a viewing log not having any information.

For estimation learning, an efficient data set is created. The viewing log is separated at a predetermined time interval (for example, 30 minutes), and several pieces of information are stored as a explanatory variable on the basis of the program information and the like. The estimation learning may be performed, for example, using a neural network, machine learning, deep learning, and the like.

Specifically, first, attribute data and label data are allocated to data of "station"×"week day"×"predetermined time intervals (for example, 30 minutes)" as preprocessing of estimation learning.

As the attribute data, explanatory variables are created, including a parameter regarding household viewing such as whether or not the household watches the program, a parameter regarding a broadcast slot attribute such as a broadcasting time of the program, and a parameter regarding popularity of the program such as the household audience rating of the program, and the like.

The parameter regarding the household viewing may include, for example, whether or not the household watches the program, whether or not the household watches the program for the preceding "n" weeks, whether or not the household watches the program for the preceding and following "n" slots, whether or not the household watches the competing program at the corresponding time for the preceding "n" weeks, whether or not the household watches the competing program at the corresponding time for the preceding and following "n" slots, whether or not the household watches a program of a predetermined station at the corresponding time for the preceding "n" weeks, whether or not the household watches a program of a predetermined station at the corresponding time for the preceding and following "n" slots, a total viewing probability for each week day and each hour, a total viewing probability for each week day, each time, and each station, a total viewing probability for each genre, an householder attribute, and the like. Such explanatory variables may constitute a category regarding the household viewing.

The parameter regarding the broadcast slot attribute may include, for example, week day, hour, station, genre, genre for the preceding and following "n" slots, regularity, whether or not the program is a special program, whether or not the program is an ultra special program, a household audience rating at the corresponding week day, hour, and station for 52 weeks, a household audience rating at the corresponding week day and hour for 52 weeks, a household audience rating for the corresponding genre, an individual audience rating at the corresponding week day, hour, and station for 52 weeks, an individual audience rating at the corresponding week day and hour for 52 weeks, an individual audience rating for the corresponding genre, and the like. Such explanatory variables may constitute a category regarding the broadcast slot attribute.

The parameter regarding the popularity of the program may include, for example, a household audience rating of the corresponding program, a household audience rating of the corresponding program for the preceding "n" weeks, a household audience rating of the corresponding program for the preceding and following "n" slots, an individual audience rating of the corresponding program, an individual audience rating of the corresponding program for the preceding "n" weeks, an individual audience rating of the corresponding program for the preceding and following "n" slots, a total view count of a detailed electronic program table, a view count of the detailed electronic program table for each age, a publicity placement volume (converted into monetary amount), a search count of a search website in the unit of program, the number of topics in a tweet in the unit of program, a popularity of a performer (search count), and the like. Such explanatory variables may constitute a category regarding the popularity of the program.

Note that all parameters may be employed for the attribute data, or a part thereof may be employed depending on use purposes.

As the label data, information regarding whether or not a predetermined target actually watches that slot (for example, a flag data of "1" or "0") is created. Note that the target may be identified on the basis of an age classification (M1-M3 layers, F1-F3 layer, C layer, T layer) used in the field of marketing. In addition, the flag may be set to "1" when the viewing has been performed during a certain proportion or more (for example, two thirds or more) of a predetermined period of time.

The attribute data and the label data constitute a data set. For example, in the deep learning, the composition of the number of hidden layers (intermediate layers) is tuned such that the F value (one of evaluation criteria of the prediction result) increases, and a learning machine is constructed using a normalization linear function as an activation function. The accuracy of the learning machine can be improved by obtaining the F value for the prediction of the presence or absence of each target and performing iterative calculation based on periods of the training data and the test data. If the periods of the training data and the test data are different from each other, it is preferable to evaluate the accuracy of the learning machine at every predetermined period.

By inputting a data set of the attribute data and the label data extracted from the viewing log of a predetermined household into the learning machine, it is possible to estimate the individuals constituting the household.

According to the fourth embodiment described above, it is possible to separate an individual viewing log of a predetermined household from the viewing log data of the household by using the estimation method which is a result of the learning.

Fifth Embodiment

As described above in the second modification of the first embodiment, the viewing log that can be acquired and possessed by the television station is only data regarding the viewing of the own program. In the system illustrated in FIG. 1, it is not always possible to receive the viewing log from all the broadcasting stations. Therefore, the viewing log that the matching server 40 can use may not include information of some stations. In this case, for example, it becomes difficult for a user who frequently watches a station not including the information to perform advertisement distribution in consideration of the viewing log.

Even when the viewing log can be received from all the broadcasting stations, there is a possibility that the time interval at which the viewing log is recorded may be different for each broadcasting station. In this case, it is conceived that there is a station having no viewing log at a certain timing.

In this regard, assuming that there is a television station that does not provide a viewing log, it is desirable that all the viewing logs associated with a predetermined user (IP address) can be estimated from the viewing log that have been provided elsewhere (missing).

According to the fifth embodiment, the viewing log of the "missing" part is estimated by using the aforementioned representative viewing log and separately collected Web access log data as training data. The separately collected Web access log data may be referred to as a "representative Web access log". It is desirable that the representative viewing log is the Web access log data associated with (linked to) the representative viewing log described above.

For example, as a representative Web access log, data obtaining by combining the television viewing log and the Web browsing history may be employed. Note that, depending on the content to be estimated, the aforementioned representative viewing log may be employed instead of or in addition to the representative Web access log.

The estimation processing may be performed by the matching server 40 or the viewing log management server 50. The target data used for the estimation learning may include, for example, a viewing log of only a specific broadcasting station. The estimation may be performed by calculating a viewing probability (=viewing minutes/broadcasted minutes) of the predetermined time interval of the competing station in the unit of household on the basis of an AND condition of a predetermined time interval (for example, 10 minutes) for a specific station and a viewing trend in the past "X (X>0)" weeks (for example, may be obtained using the representative viewing log and/or the representative viewing Web access log). As the estimation result, at least one of a possibility of turning off the television, a possibility of viewing a program of the other station, and a possibility of browsing the Web may be obtained.

According to the fifth embodiment described above, it is possible to estimate all of the viewing logs from the missing viewing logs by using the estimation method as a learning result. For example, it is possible to estimate a user having a characteristic (viewing tendency) similar to that of a predetermined user from the viewing log of the predetermined user and estimate the viewing tendency of the user.

Note that, in the information processing method described above, the matching server 40 associates the viewing log of the television 10 and the advertisement ID regarding the device 20 on the basis of the IP address. However, the invention is not limited thereto. For example, the matching server 40 may use information for identifying a network (LAN) to which the television 10 and the device 20 belong (also referred to as "network identification information", "information for identifying the router 30", and the like) for the association instead of or in addition to the IP address. The network identification information may be, for example, a Media Access Control (MAC) address of the router 30.

While an example in which the viewing log and the advertisement ID are associated has been described, the viewing log may be associated with other information regarding the advertisement distributed to the device 20 instead of or in addition to the advertisement ID. For example, the viewing log and the history of the advertisement distributed to the device 20 (advertisement log) may be associated with each other.

Sixth Embodiment

The IP address of the television 10, the information regarding the viewing log, the information regarding the identifier of the television, the IP address of the device 20, the information regarding the advertisement ID for the device 20, and the like described above may be used to estimate a trait or preference of a user.

For example, at least one of the matching server 40, the viewing log management server 50, and the advertisement distribution server 60 may identify or estimate a specific audience group on the basis of this information, and may perform control for distributing the Internet advertisement for the specific audience group.

Here, an object is to distribute an Internet advertisement (which may also be referred to as "digital advertisement" or "digital video") to a person who does not watch a predetermined television CM. That is, the specific audience group described above may be an audience group who does not watch the predetermined television CM.

In order to achieve the aforementioned object, it is necessary to distribute an Internet advertisement to the device identification information (such as the Cookie ID or the mobile advertisement ID) of the device 20 owned by a person who has not watched a predetermined television CM. In order to identify or estimate a person who has not watched the television CM, for example, the following four methods may be conceivable.

In the first method, it is determined whether or not the user has actually made contact with a predetermined television CM using the television viewing log, and a person who does not actually make contact with the predetermined television CM is identified. In the first method, since it is possible to distribute the Internet advertisement by identifying a person who does not watch a predetermined television CM. Therefore, it is possible to suppress an advertisement distribution scale with high accuracy.

In the second method, a usual television viewing amount is determined using the television viewing log, and the audience group of people who have not watched the predetermined television CM is estimated. Using the second method, it is possible to distribute the Internet advertisement to more people, compared to the first method.

In the third method, a person similar to a person who has a small usual television viewing amount is estimated from data of the DMP, for example, using a multi-dimensional vector. In the third method, it is possible to further increase the advertisement distribution scale, compared to the second method.

In the fourth method, characteristic points of affinity categories such as a household composition, a residential area, gender/age, an occupation, and a hobby taste are analyzed from DMP data, and an advertisement package of the affinity category having a higher proportion of persons who have a small usual television viewing amount is created, for example, in descending order of the accuracy. Using the fourth method, it is possible to increase the advertisement distribution scale, compared to the third method.

The first to fourth methods may be employed solely or as a combination. For example, the first to the fourth methods may be additionally used in order until the number corresponding to a distribution reach (the number of Unique Users (UU)) set as a target is obtained. Specifically, only a predetermined method (for example, the first method) may be used when the advertisement scale is small. Alternatively, when the advertisement scale is large, another method (for example, the second, third and/or fourth method) may be used in addition to the predetermined method. Note that the predetermined method may be the second method without limiting to the first method.

In the second method, estimation and advertisement distribution of a specific audience group may be performed, for example, in the following steps. Note that operation entities of each step may include the matching server 40, the viewing log management server 50, the advertisement distribution server 60, or a combination thereof. Here, it is assumed that the audience group is classified by an evaluation criterion (such as the television viewing time and frequency) indicating that the audience group often makes contact with television. However, the evaluation criterion for classification is not limited thereto.

First, the television viewing time (such as viewing minutes) and the viewing frequency are calculated for each of the predetermined identifiers (for example, the device identification information associated with the television 10 such as the Cookie ID and the mobile advertisement ID) used to identify a user using the television viewing log (step ST301). Such calculation may be performed, for example, using the television viewing log corresponding to at least one of a specific date/time, a week day, and a broadcasting station (channel).

A part of or all of the users are classified into the audience group on the basis of the television viewing time and/or the viewing frequency for each user calculated in step ST301 (step ST302). Here, the audience groups are referred to as "HH", "H", "M", "L", and "N" in descending order of the evaluation criterion.

For example, in step ST 302, first, a user corresponding to the lowest value (for example, "0") of both the viewing time and the viewing frequency is classified as "N", and a user having both the viewing time and the viewing frequency equal to or more than a predetermined threshold value (for example, top 10%) may be classified as "HH".

Then, a deviation value of the viewing time and a deviation value of the viewing frequency may be obtained from the data of the remaining unclassified users, and the remaining users may be divided into three groups starting from the users having the higher deviation value, so that they are classified into "H", "M", and "L" in descending order.

Then, the audience group as the advertisement distribution target is determined (step ST303). For example, here, it is assumed that a person who does not watch a television so much (also referred to as a "television light viewer" or the like) is determined as the advertisement distribution target. However, the invention is not limited thereto. The television light viewer may be determined as a user corresponding to any one of "L" and "N" described above.

The users to whom the advertisement is actually distributed among the advertisement distribution target audience group may be further restricted on the basis of information regarding the distribution status of the Internet advertisement, characteristic information of each user, and the like (which may include, for example, hobby, gender, and age, and may be referred to as "affinity category", "affinity segment", "interest category", and the like).

For example, for a certain user included in the predetermined audience group, the Internet advertisement to be distributed may be determined on the basis of a display time of the Internet advertisement (the use time (such as minutes) on the advertisement distribution server 60 (DMP)), a referrer (information on a page as a link source of the advertisement), a contact keyword (such as a search keyword in a predetermined search engine), user's hobby preference, gender, age, and the like separately obtained on a questionnaire basis.

For the users included in the predetermined audience group, the Internet advertisement to be distributed may be determined on the basis of information regarding a distribution status of the Internet advertisement to the users included in the other audience group (and/or a representative user of the other audience group such as an average of the users), and comparison of the characteristic information of each user.

For example, the Internet advertisement may be distributed to the device 20 determined to be used by the predetermined audience group (for example, light viewers) (for example, matched using the TVID, WebID, and the like) on the basis of comparison with other audience groups (such as "HH" and "H").

As described above, according to the second method, for example, the Internet advertisement can be distributed to the device 20 of a user who does not watch the television during a predetermined time range and/or a user who does not normally watch the television.

Note that the Internet advertisement may be distributed to a user who is difficult to perform matching processing between the television 10 and the device 20 (also referred to as a "non-matching user") on the basis of the information on a user (also referred to as a "matching user") who can perform the matching processing.

(1) Information regarding the distribution status of the Internet advertisement, characteristic information of each user, and the like may be multi-dimensionally vectorized for each user (and/or representative users of each audience group), or (2) characteristic points may be extracted (for example, machine learning such as a random forest and deep learning may also be used).

In the case (1) described above, a distance between the multi-dimensional vector regarding users included in the predetermined audience group and the multi-dimensional vector regarding the user (and/or the representative user) included in the other audience group may be calculated, and the multi-dimensional vectors may be set as an advertisement distribution target as a predetermined audience group in the order of the distance closer therebetween.

For example, a user (device 20) included in the predetermined audience group classified in the step ST302 described above and a user (device 20) having a similar behavior on the Web may be included in this predetermined audience group. Whether or not a plurality of users take similar actions may be determined using the DMP data of the advertisement distribution server 60 (DMP) depending on, for example, whether or not the same and/or similar advertisement has been distributed, whether or not the same and/or similar Web site has been visited, and the like. As a result, it is possible to implement the third method.

In the case (2) described above, the Internet advertisement may be distributed to a user such that a proportion of a predetermined audience group increases on the basis of the characteristic points regarding the user included in the predetermined audience group. For example, a combination in which a proportion of a predetermined audience group increases may be created as a targeting menu on the medium side until the number corresponding to the number of UUs is achieved.

For example, characteristic information that is highly likely to be possessed by a user (device 20) included in a predetermined audience group classified in step ST302 described above may also be determined. When the Internet advertisement is distributed to a predetermined audience group, the same Internet advertisement may be distributed to a user having this characteristic information regardless of presence or absence of the television viewing log. The fourth method may be implemented as a result.

The association between the predetermined audience group and the affinity category may be performed as follows.

For example, first, affinity categories (such as "like a game" or "like sports") of each user may be estimated (set or granted) by using a questionnaire result or the like answered by each user. In addition, affinity categories (such as "television light viewer (television light viewer group)", "television heavy viewer group", and the like) regarding television viewing of each user may be estimated (set, granted) using the television viewing log. For example, the television heavy viewer group category may be assigned to the top 50% viewing time users out of all users, or the television light viewer group category may be assigned to the lower 50% viewing time users.

Then, a proportion of the television light viewer group may be counted for each affinity category, and an affinity category with a high/low proportion of the television light viewer group may be determined. If it is desired to distribute an Internet advertisement to a person who does not watch a predetermined television CM, an affinity category having a high proportion of the television light viewer group may be set as a distribution segment of the DMP, and an affinity category having a low proportion may be set as an exclusion segment.

While a case in which the Internet advertisement is distributed to a person not watching a predetermined television CM has been described, the sixth embodiment may be used for other purposes. For example, the sixth embodiment may be employed to distribute the Internet advertisement to a specific group or to distribute the television CM to a person who does not watch the predetermined Internet advertisement. In order to implement such configurations, the description of the aforementioned example may be changed as appropriate.

Other Examples

Note that, in each embodiment described above, advertiser conversion (CV) data may be employed in at least one of the matching server 40, the viewing log management server 50, and the advertisement distribution server 60. Here, the "CV" means that the user who watches a certain advertisement achieves a goal (for example, purchase of goods) set by the advertiser. In addition, the CV data may represent conversion such as a visit to a brand site, member registration, a product purchase, and the like which are the basis for calculating the advertiser's Key Performance Indicator (KPI). The advertisement distribution server 60 or the like may control the setting in real time such that conversion is enhanced.

On the basis of the CV data, the advertisement distribution server 60 may determine a condition (also referred to as an "exclusion condition") that does not contribute to the CV and control such that the advertisement is not distributed when the condition is satisfied. The condition that does not contribute to the CV may be, for example, at least one of the following conditions (1) to (7):

(1) access triggered by contact of a specific CM slot and/or a program slot;

(2) access corresponding to specific audience data (such as a user, a boat, or a crawler belonging to a predetermined company);

(3) advertisement of a predetermined Web page;

(4) access from a predetermined referrer (media);

(5) user's access corresponding to a predetermined geographic location and/or demographic data (such as age);

(6) access from a device corresponding to a predetermined specification (such as a poor resolution) and/or a communication environment (such as a slow communication speed); and (7) access from a user who uses a predetermined language.

For example, the advertisement distribution server 60 analyzes the referrers, IP addresses, and the like of a user who has achieved the CV via the television CM, and automatically excludes IDs from the cooperating segments within the DMP, so as to suppress repeated advertising for the user who has already achieved the CV of the advertisement and improve the advertisement performance. As a result, it is possible to improve a Cost Per Action (CPA).

When a designation condition for designating the advertisement distribution target is employed, the distribution scale decreases more and more. For this reason, if the distributed advertisement list itself is small, the number of times of contact (frequency) is excessively generated, and although there is a site visit, the conversion does not easily occur disadvantageously. Meanwhile, using the determination based on the exclusion condition for exclusion from the advertisement distribution target as described above, it is possible to suppress the aforementioned problem.

For example, according to the fourth embodiment, the number of times of contact with the predetermined CM for each individual person may be estimated from the number of contacts (frequency) to a predetermined CM per household obtained on the basis of the household viewing log.

Even when the television 10 and/or the device 20 are not usable, the advertisement distribution server 60 may estimate that the user is under the viewing environment of the television 10 (or at home). In this case, it is possible to implement advertisement distribution suitable for the user.

According to an aspect of the invention, there may be a case where the CV is achieved just via a television CM (for example, by visiting a predetermined Web site), a case where the CV is achieved just with an Internet advertisement, a case where the CV is achieved by making contact with both the television CM and the Internet advertisement, and a case where the CV is achieved without making contact with any one of the television CM and the Internet advertisement. For this reason, the advertiser can implement allocation of an advertisement budget to improve the CV achievement rate by utilizing both the television and the Internet.

(Configuration of Equipment)

Figure 4:
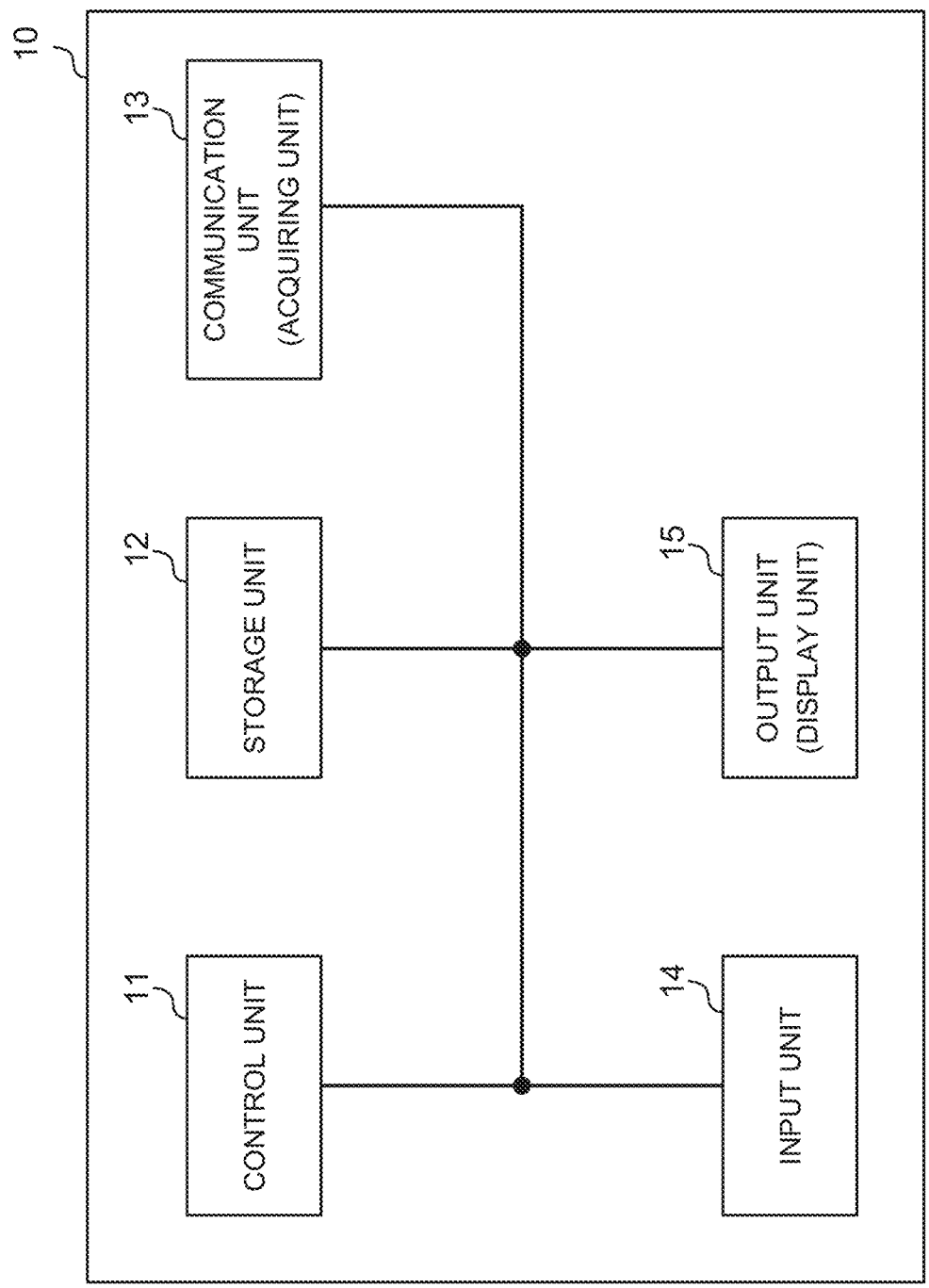
FIG. 4 is a diagram illustrating an exemplary functional configuration of a television according to an embodiment of the invention.

FIG. 4 is a diagram illustrating an exemplary functional configuration of the television according to an embodiment of the invention. As illustrated in FIG. 4, the television 10 includes a control unit 11, a storage unit 12, a communication unit (acquiring unit) 13, an input unit 14, and an output unit (display unit) 15. FIG. 4 mainly illustrates the functional blocks of the characteristic portions of this embodiment, and the television 10 may also have other functional blocks necessary for other processing. Furthermore, some functional blocks may not be included.

The control unit 11 controls the television 10. For example, the control unit 11 displays an image on the basis of a user's manipulation or controls transmission of the viewing log. The control unit 11 may include a controller, a control circuit, or a control apparatus described on the basis of common understandings in the technical field of the present invention.

The storage unit 12 stores (holds) information used by the television 10. For example, the storage unit 12 sequentially stores the viewing log. For example, the storage unit 12 may include a memory, a storage, a storing apparatus, or the like described on the basis of common understandings in the technical field of the present invention.

The communication unit (acquiring unit) 13 transmits a viewing log to the matching server 40 and/or the viewing log management server 50. In addition, the communication unit 13 outputs various types of information received from the server 20 and/or device 30 to the control unit 11.

The communication unit 13 may include a transmitter/receiver, a Tx/Rx circuit, or a Tx/Rx apparatus described on the basis of common understandings in the technical field of the present invention. Note that the communication unit 13 may also include a transmitter unit and a receiver unit.

The input unit 14 receives an input by a manipulation from the user. In addition, the input unit 14 may be connected to a predetermined device, a storage medium, or the like to receive input data. The input unit 14 may output the input result, for example, to the control unit 11.

The input unit 14 may include an input apparatus such as a keyboard, a mouse, and a button, an input/output terminal, an input/output circuit, and the like described on the basis of common understandings in the technical field of the present invention. In addition, the input unit 14 may include a unit integrated with the display unit (such as a touch panel).

The output unit (display unit) 15 reproduces a predetermined content and outputs it. For example, the output unit 15 may include a display unit that displays an image, a sound output unit that outputs sound, and the like. For example, the display unit may include a display apparatus such as a display or a monitor described on the basis of common understandings in the technical field of the present invention. In addition, the sound output unit may include an output apparatus such as a loud speaker or the like described on the basis of common understandings in the technical field of the present invention.

The output unit 15 may include, for example, a computing unit, an arithmetic circuit, an arithmetic unit, a player, an image/video/audio processing circuit, an image/video/audio processing unit, an amplifier, and the like described on the basis of common understandings in the technical field of the present invention.

The device 20, the router 30, the matching server 40, the viewing log management server 50, the advertisement distribution server 60, and the like may have the same configurations as those of FIG. 4. Hereinafter, some parts will be described in details. Note that the configurations corresponding to each functional block in FIG. 4 of each apparatus are expressed by changing the lower digit of the reference numeral indicating each device as in FIG. 4.

The control unit 21 of the device 20 performs control to execute an application such as a browser in response to a user's manipulation. In response to the operation of the application, the communication unit 23 transmits an advertisement request to the advertisement distribution server 60, and receives an advertisement or an advertisement ID (such as a campaign ID).

The communication unit (acquisition unit) 43 of the matching server 40 acquires first identification information at least including the IP address and information regarding the viewing log of the television, and second identification information at least including the IP address and the advertisement ID.

The control unit 41 performs control to identify a combination of the viewing log and the advertisement ID corresponding to the same IP address on the basis of the first identification information and the second identification information.

In the case where the first identification information further includes information on the identifier of the television, the control unit 41 may perform control to identify a plurality of viewing logs corresponding to the information regarding the same television identifier based on a plurality of pieces of first identification information.

The control unit 41 may determine that a plurality of viewing logs corresponding to the information regarding the same television identifier are information regarding the same user if information regarding the television identifiers included in the plurality of pieces of first identification information is identical even when the IP addresses included in the plurality of pieces of first identification information are different.

Even when the information regarding the television identifiers included in the plurality of pieces of first identification information is different, if the IP addresses included in the plurality of pieces of first identification information are identical, the control unit 41 may determine that a plurality of viewing logs corresponding to the same IP address are information regarding the same user. Note that one of the pieces of information regarding the television identifiers included in the plurality of pieces of first identification information may be the equipment ID, and the other may be the B-CAS ID.

When the number of advertisement IDs corresponding to the same IP address is equal to or larger than a predetermined threshold value, the control unit 41 may perform control so as not to perform advertisement distribution based on the viewing log for this IP address.

(Hardware Configuration)

Note that the block diagrams used in the description of the aforementioned embodiments illustrate functional unit blocks. These functional blocks (elements) are implemented by an arbitrary combination of hardware and/or software. In addition, a means for implementing each functional block is not particularly limited. That is, each functional block may be implemented by a single physically coupled apparatus, or two or more physically separated apparatuses may be coupled in a wired or wireless manner to implement the functional blocks using a plurality of apparatuses.

Figure 5:
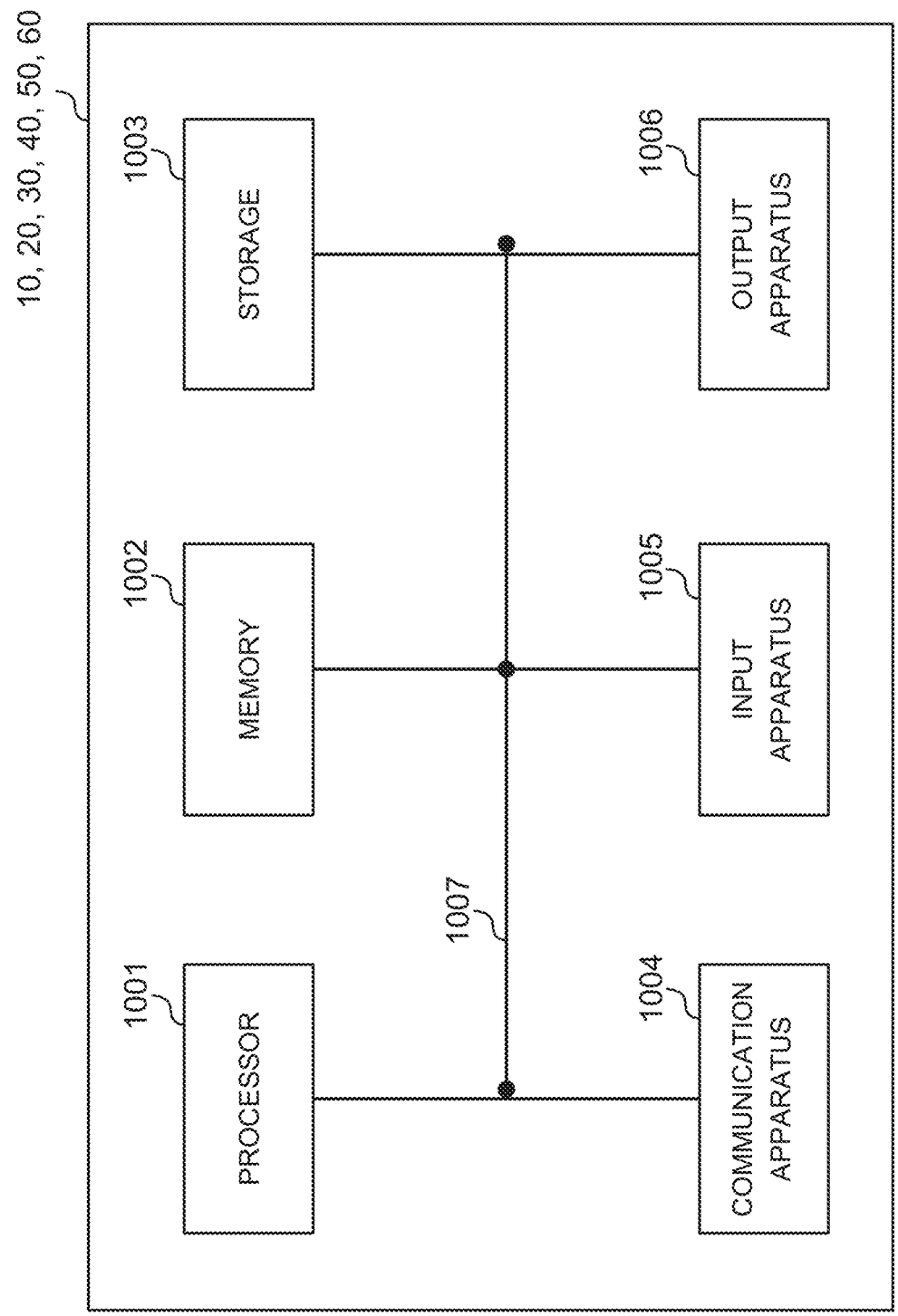
FIG. 5 is a diagram illustrating an exemplary hardware configuration including a television, a device, a router, and a server according to an embodiment of the invention.

For example, the radio base station, the user terminal, and the like according to an embodiment of the invention may function as a computer that performs a processing of the radio communication method according to the present invention. FIG. 5 is a diagram illustrating an exemplary hardware configuration including a television, a device, a router, and a server according to an embodiment of the invention. The television 10, the device 20, the matching server 40, and the like described above physically include a computer apparatus having a processor 1001, a memory 1002, a storage 1003, a communication device 1004, an input device 1005, an output device 1006, a bus 1007, and the like.

In the following description, the term "apparatus" may be read as a circuit, a device, a unit, and the like. Hardware configurations of the television 10, the device 20, the matching server 40, and the like may include one or a plurality of apparatuses illustrated in the drawings, or may not include a part of the apparatuses.

For example, although only one processor 1001 is illustrated, there may be a plurality of processors. In addition, the processing may be executed by one processor, or may be executed by one or more processors simultaneously, sequentially, or in other manners.

Each function of the television 10, the device 20, the matching server 40, and the like is implemented by causing a predetermined software (program) to be read on the hardware such as the processor 1001 or the memory 1002 to allow the processor 1001 to perform computation, and controlling communication by the communication apparatus 1004 and reading and/or writing of data in the memory 1002, the storage 1003, and the like.

The processor 1001 operates, for example, an operating system to control the entire computer. The processor 1001 may include a Central Processing Unit (CPU) including an interface with a peripheral apparatus, a control apparatus, an arithmetic unit, a register, and the like. Note that each unit such as the control unit 11 described above may be implemented by the processor 1001. The processor 1001 may be embedded in one or more chips.

The processor 1001 reads a program (program code), a software module, data, and the like from the storage 1003 and/or the communication apparatus 1004 to the memory 1002, and executes various processes depending on them. As the program, a program that causes a computer to execute at least a part of the operations described in the aforementioned embodiments is employed. For example, the control unit 11 may be implemented by a control program stored in the memory 1002 and operated on the processor 1001, or may be similarly implemented for other functional blocks.

The memory 1002 may be a computer readable recording medium, and may include, for example, at least one of a Read Only Memory (ROM), an Erasable Programmable ROM (EPROM), an Electrically EPROM (EEPROM), a Random Access Memory (RAM), or other suitable memory media. The memory 1002 may be referred to as a register, a cache, a main memory (main memory device), or the like. The memory 1002 may store executable programs (program codes), software modules, and the like for implementing a wireless communication method according to an embodiment of the invention.

The storage 1003 is a computer-readable recording medium, and may include at least one of a flexible disk, a floppy (registered trademark) disk, a magneto-optical disk (for example, a compact disk (such as CD-ROM) or the like), a digital versatile disk, a Blu-ray (registered trademark) disk, a removable disk, a hard disk drive, a smart card, a flash memory device (for example, a card, a stick, and a key drive), a magnetic stripe, a database, a server, and other suitable storage media. The storage 1003 may be referred to as an auxiliary storage device. Note that the storage unit 12 described above may be implemented by the memory 1002 and/or the storage 1003.

The communication apparatus 1004 is hardware (transceiver device) for performing communication between computers via a wired and/or wireless network, and may be also referred to as, for example, a network device, a network controller, a network card, a communication module, and the like. Note that the communication unit 13 described above may be implemented by the communication apparatus 1004.

The input apparatus 1005 is an input device (such as a keyboard or a mouse) that receives an input from the outside. The output apparatus 1006 is an output device (such as a display and a loudspeaker) that performs output to the outside. Note that the input apparatus 1005 and the output apparatus 1006 may be an integrated structure (for example, a touch panel). Note that the input unit 14 and the output unit 15 described above may be implemented by the input apparatus 1005 and the output apparatus 1006, respectively.

Each apparatus such as the processor 1001 and the memory 1002 is connected via a bus 1007 for communicating information. The bus 1007 may include a single bus or different buses between the apparatuses.

The television 10, the device 20, the matching server 40, and the like may include hardware such as a microprocessor, a Digital Signal Processor (DSP), an Application Specific Integrated Circuit (ASIC), a Programmable Logic Device (PLD), a Field Programmable Gate Array (FPGA), or a part or all of each functional block may be implemented by the hardware. For example, the processor 1001 may be embedded in at least one of the hardware.

Modifications

Note that the terms described in this specification and/or the terms necessary for understanding of the present specification may be substituted with terms having the same or similar meanings.

The information, parameters, and the like described herein may be expressed as absolute values, relative values from a predetermined value, or corresponding other information. In addition, the name used for parameters or the like herein is not limitative in any sense.

The information, the signals, and the like described herein may be expressed using any of a variety of different technologies. For example, data, instructions, commands, information, signals, bits, symbols, chips, and the like that may be mentioned throughout the aforementioned description may be expressed as voltages, currents, electromagnetic waves, magnetic fields or particles, optical fields or photons, or any combination thereof.

Information, signals, and the like may be input or output via a plurality of network nodes. The input/output information, the signals, and the like may be stored in a specific place (such as a memory) or may be managed in a table. The information to be input or output, signals, and the like can be overwritten, updated or appended. Output information, signals, and the like may also be deleted. The input information, signals, and the like may be transmitted to other apparatuses.

Notification of predetermined information (for example, notification of "being X") is not limited to being performed explicitly, but may be performed implicitly (for example, by not notifying the predetermined information).

The software is naturally widely interpreted to mean instructions, instruction sets, codes, code segments, program codes, a program, a subprogram, a software module, an application, a software application, a software package, a routine, a subroutine, an object, an executable file, an execution thread, a procedure, a function, and the like regardless of whether the software is called software, firmware, middleware, microcode, a hardware description language, or other name.

Software, instructions, information, and the like may be transmitted and received via a transmission medium. For example, if the software is transmitted from a web site, a server, or a remote source using a wired technology (such as a coaxial cable, a fiber optic cable, a twisted pair, and a digital subscriber line (DSL)) and/or a wireless technology (such as infrared rays, microwaves, and the like), these wired and/or wireless technologies are included in the definition of the transmission medium.

The terms "system" and "network" as used herein are interchangeable.

Each aspect/embodiment described herein may be used solely or in combination, or may be switched in response to execution. In addition, processing order, sequences, flowcharts, and the like of each aspect/embodiment described herein may be interchangeable as long as there is no inconsistency. For example, in the method described herein, elements of various steps are presented in an exemplary order and are not limited to the specific presented order.

The phrase "on the basis of" used herein does not mean "only on the basis of" unless specified otherwise. In other words, the statement "on the basis of" means both "only on the basis of" and "at least on the basis of".

Any reference to an element using the designation "first", "second", and the like as used herein does not generally limit the quantity or order of those elements. These designations may be used herein as a convenient method for distinguishing between two or more elements. Therefore, references to the first and second elements do not imply that only two elements may be employed, or that the first element is necessary to precede the second element in any way.

While the present invention has been described in detail hereinbefore, those skilled in the art would appreciate that the present invention is not limited to the embodiments described herein. Various corrections or modifications may be possible without departing from the spirit and scope of the present invention as defined by the scope of the claims. Therefore, the description of this specification is for exemplary purposes and does not have any restrictive meaning in the present invention.

This application is based upon and claims the benefit of priority of the prior Japanese Patent Application No. 2016-084602, filed on Apr. 20, 2016, the entire contents of which are incorporated herein by reference.

The invention claimed is:

1. An information processing method, comprising:
   acquiring first identification information at least including an Internet Protocol (IP) address, information regarding a television identifier, and information regarding a television viewing log, and second identification information at least including an IP address and an advertisement ID (Identifier); and
   performing control to identify a combination of the viewing log and the advertisement ID corresponding to the same IP address on the basis of the first identification information and the second identification information,
   wherein the control is performed by a control unit to determine whether the information regarding the television identifier and the advertisement ID belong to the same household based on at least one of a first criterion and a second criterion,
   wherein the first criterion includes a probability increasing as the number of records consecutively linked when a table of the first identification information, including a time stamp, and a table of the second identification information, including a time stamp, are respectively sorted with a set of a time stamp and an IP address, and
   wherein the second criterion includes a probability increasing as the number of records in which the same information regarding the identifier of the television and the same advertisement ID are associated with different IP addresses increases as a result of matching performed at every predetermined period.

2. An information processing apparatus, comprising:
   an acquiring unit configured to acquire first identification information at least including an Internet Protocol (IP) address, information regarding a television identifier, and information regarding a television viewing log, and second identification information at least including an IP address and an advertisement ID (Identifier); and
   a control unit configured to perform control to identify a combination of the viewing log and the advertisement ID corresponding to the same IP address on the basis of the first identification information and the second identification information, wherein the control unit determines whether the information regarding the television identifier and the advertisement ID belong to the same household based on at least one of a first criterion and a second criterion, wherein the first criterion includes a probability increasing as the number of records consecutively linked when a table of the first identification information, including a time stamp, and a table of the second identification information, including a time stamp, are respectively sorted with a set of a time stamp and an IP address, and wherein the second criterion includes a probability increasing as the number of records in which the same information regarding the identifier of the television and the same advertisement ID are associated with different IP addresses increases as a result of matching performed at every predetermined period.

3. The information processing apparatus according to claim 2, wherein the control unit performs control to identify a plurality of viewing logs corresponding to information regarding the same television identifier on the basis of a plurality of pieces of first identification information.

4. The information processing apparatus according to claim 3, wherein the control unit determines that a plurality of viewing logs corresponding to the information regarding the same television identifier are information regarding the same user if information regarding the television identifiers included in the plurality of pieces of first identification information is identical even when the IP addresses included in the plurality of pieces of first identification information are different.

5. The information processing apparatus according to claim 4, wherein the control unit determines that a plurality of viewing logs corresponding to the same IP address are information regarding the same user if the IP addresses included in the plurality of pieces of first identification information are identical even when the information regarding the television identifiers included in the plurality of pieces of first identification information is different.

6. The information processing apparatus according to claim 5, wherein the information regarding the television identifiers included in the plurality of pieces of first identification information contains an equipment ID and a BS Conditional Access Systems (B-CAS) (registered trademark) ID.

7. The information processing apparatus according to claim 3, wherein the control unit determines that a plurality of viewing logs corresponding to the same IP address are information regarding the same user if the IP addresses included in the plurality of pieces of first identification information are identical even when the information regarding the television identifiers included in the plurality of pieces of first identification information is different.

8. The information processing apparatus according to claim 7, wherein the information regarding the television identifiers included in the plurality of pieces of first identification information contains an equipment ID and a BS Conditional Access Systems (B-CAS) (registered trademark) ID.

9. The information processing apparatus according to claim 3, wherein the control unit performs control such that advertisement distribution based on the viewing log is not performed on the IP address when the number of advertisement IDs corresponding to the same IP address is equal to or larger than a predetermined threshold value.

10. The information processing apparatus according to claim 2, wherein the control unit is arranged to correct the information regarding the television viewing log based on a viewing log including individual data regarding an individual audience rating collected as a representative of the viewing tendency of general users.

11. The information processing apparatus according to claim 2, wherein the control unit is arranged to estimate the information regarding the television viewing log of a predetermined user from the television viewing log of a user having a characteristic similar to that of the predetermined user.

12. The information processing apparatus according to claim 2, wherein the control unit is arranged to classify a part of or all of the users into an audience group based on the television viewing time and/or the viewing frequency for each user, and to perform an advertisement distribution based on the viewing log to a device utilized by users in a predetermined audience group.

13. An information processing system comprising an information processing apparatus, the information processing apparatus including:

an acquiring unit configured to acquire first identification information at least including an Internet Protocol (IP) address, information regarding a television identifier, and information regarding a television viewing log, and second identification information at least including an IP address and an advertisement ID (Identifier); and a control unit configured to perform control to identify a combination of the viewing log and the advertisement ID corresponding to the same IP address on the basis of the first identification information and the second identification information, wherein the control unit determines whether the information regarding the television identifier and the advertisement ID belong to the same household based on at least one of a first criterion and a second criterion, wherein the first criterion includes a probability increasing as the number of records consecutively linked when a table of the first identification information, including a time stamp, and a table of the second identification information, including a time stamp, are respectively sorted with a set of a time stamp and an IP address, and wherein the second criterion includes a probability increasing as the number of records in which the same information regarding the identifier of the television and the same advertisement ID are associated with different IP addresses increases as a result of matching performed at every predetermined period.

14. A non-transitory computer-readable medium containing a program that causes a computer to execute processes, including:

acquiring first identification information at least including an Internet Protocol (IP) address, information regarding a television identifier, and information regarding a television viewing log, and second identification information at least including an IP address and an advertisement ID (Identifier); and performing control to identify a combination of the viewing log and the advertisement ID corresponding to the same IP address on the basis of the first identification information and the second identification information, wherein the control is performed by a control unit to determine whether the information regarding the television identifier and the advertisement ID belong to the same household based on at least one of a first criterion and a second criterion, wherein the first criterion includes a probability increasing as the number of records consecutively linked when a table of the first identification information including, a time stamp, and a table of the second identification information, including a time stamp, are respectively sorted with a set of a time stamp and an IP address, and wherein the second criterion includes a probability increasing as the number of records in which the same information regarding the identifier of the television and the same advertisement ID are associated with different IP addresses increases as a result of matching performed at every predetermined period.

* * * * *